UNITED STATES PATENT OFFICE.

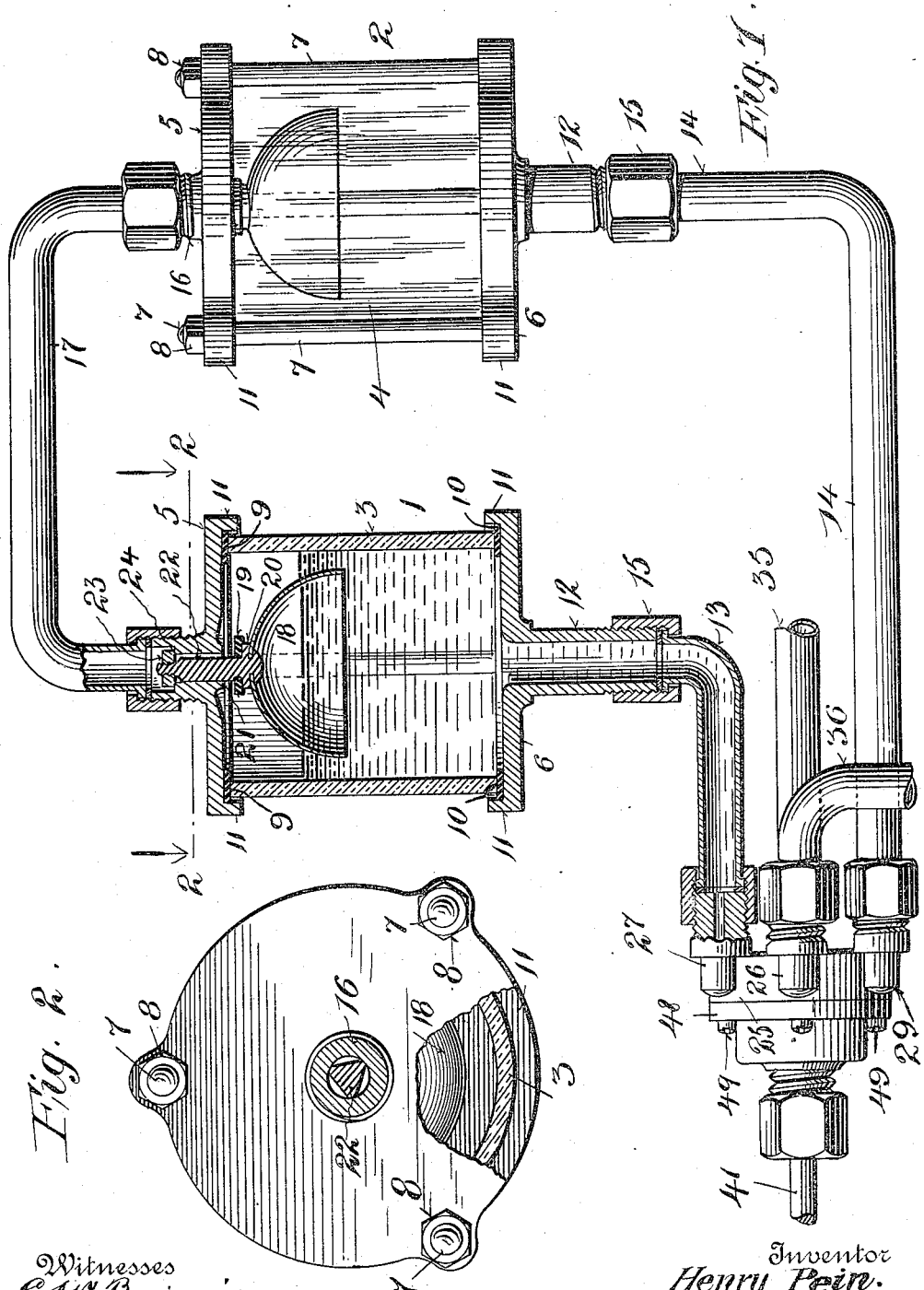

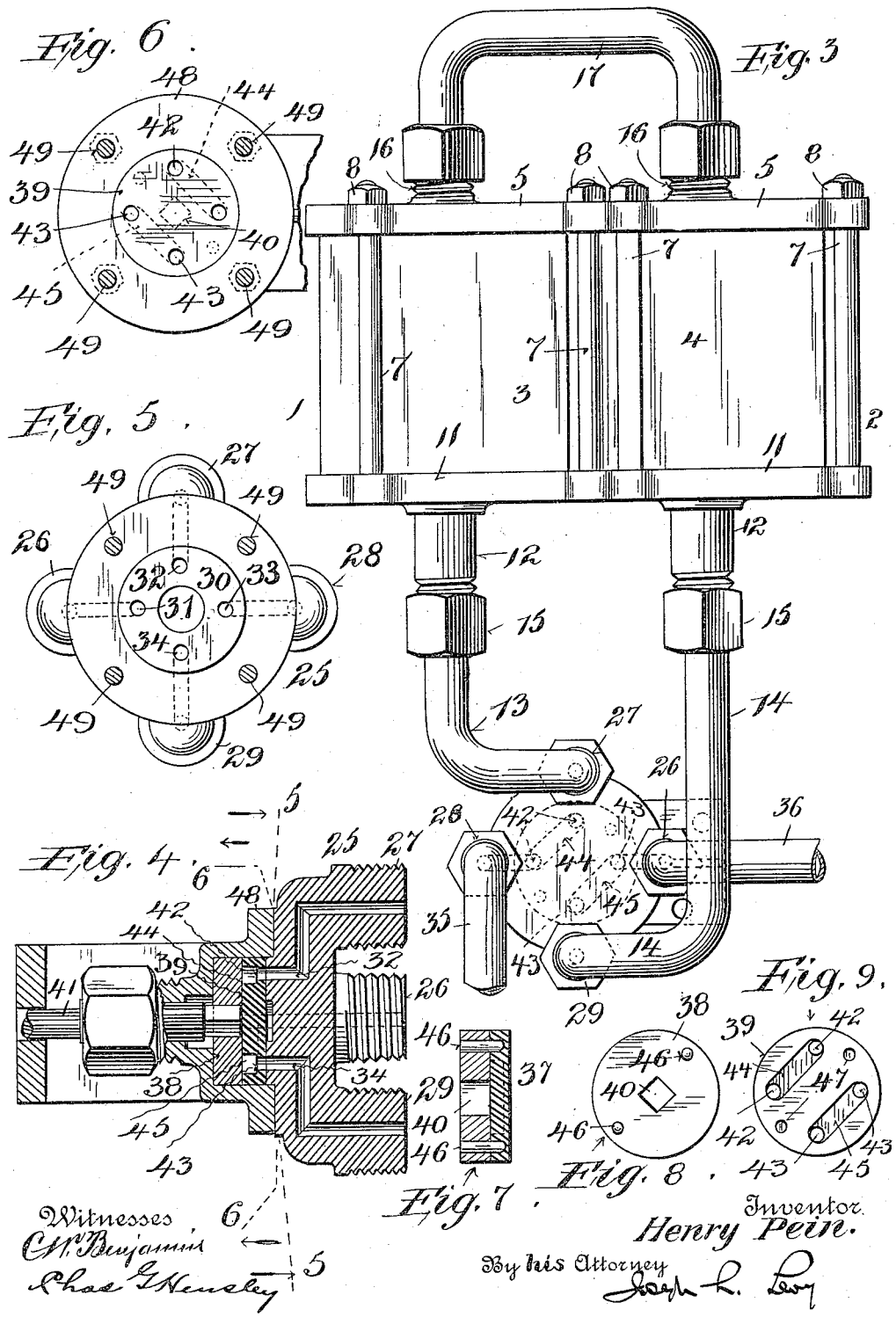

HENRY PEIN, OF JERSEY CITY, NEW JERSEY, ASSIGNOR, BY MESNE ASSIGNMENTS, TO CENTADRINK-FILTERS COMPANY, INC., A CORPORATION OF NEW YORK.

LIQUID-MEASURING DEVICE.

1,168,327.      Specification of Letters Patent.      Patented Jan. 18, 1916.

Application filed April 2, 1906, Serial No. 309,337. Renewed November 27, 1915. Serial No. 63,907.

*To all whom it may concern:*

Be it known that I, HENRY PEIN, a citizen of the United States, and a resident of Jersey City, county of Hudson, and State of New Jersey, have invented certain new and useful Improvements in Liquid-Measuring Devices, of which the following is a specification.

In the making and dispensing of aerated liquids, it is very difficult, where it is desired to run off certain quantities of liquid, such as in a vending machine, to produce a device which will measure the liquid without allowing the outside air to enter into the mixture, and then discharge the liquid at a rapid rate. Devices for this purpose have been too slow in the discharge of the liquid, partly on account of its being charged with gas, and they have not been sufficiently effective in their automatic action.

It is my object to produce a device which will overcome the various objections to former devices by providing a measurer with a plurality of measuring cups which are adapted to be alternately filled and emptied, one being emptied while the other is being filled, so that as soon as a glass of water has been run off from a vending machine, another glass may be immediately run off without waiting for a cup to be filled, and thus making the machine continuous in its action. In doing this I also shift the top pressure from one cup to the other alternately, to force the liquid out of the cup which is being emptied, thus giving a full, rapid stream, and also to give room for the incoming liquid in the other cup.

While the principal part of my invention resides in the measuring cups, I have also devised a novel form of valve to be used therewith which forms a very simple and effective combination for carrying forward the objects of my invention.

While my invention is especially designed to be used in an aerating machine where the liquid is charged with gas, and to overcome the difficulties peculiar to such machines, nevertheless my improvements may be used to advantage with other machines.

One way of carrying out my invention will be more fully hereinafter described.

In the drawings forming a part of this application, Figure 1, is a side elevation of the cups, one of which is shown in section, Fig. 2, is a section taken on the line 2—2 of Fig. 1, with a part broken away for illustration, Fig. 3, is an elevation showing the way in which the cups are connected to the valve, Fig. 4 is a longitudinal section through the valve, Figs. 5 and 6 are end views of the parts separated as indicated in Fig. 4 by the lines 5—5 and 6—6 respectively, and looking in the direction of the arrows, Fig. 7 is a section through the valve, which is made in two parts, and, Figs. 8 and 9 are plans of the two members of the valve.

In carrying out my invention I provide at least two receptacles for containing a given quantity of liquid each, and these I will call the measuring cups. They may be of any desired shape, but as herein constructed (and this is the form I prefer) they are cylindrical, and are illustrated at 1 and 2 in the drawings, each of the cups being a duplicate of the other. They are so connected together that the top pressure will pass back and forth from one cup to the other as one or the other is emptying. These cups in the present form and their connections are constructed as follows: The body of the cups are formed preferably of glass cylinders 3 and 4 of sufficient size to produce a cup of the required size, say enough to hold a glass of water each. The cylinder is held between the top and bottom plates 5 and 6 by means of bolts 7 and nuts 8, (three on each cup being sufficient) which securely holds the top and bottom to the cylinder. Washers 9 and 10 are provided between the cylinder and the top and bottom to hermetically seal the same. The bottom and top have the usual flanges 11 to hold the cylinder in place. The bottom plates are provided with a neck 12 to which the pipes 13 and 14 are secured by a proper connection 15. The purpose of these pipes 13 and 14 will be described later. As the cups and their connections are similar, the numbering may be followed on either, the only difference being in the connections of the pipes 13 and 14 with the valve. The top of the cup is provided with a screw threaded neck 16 to which is connected, by a packed connection, a pipe 17 which passes from one cup to the other, to form an air or gas passage from one cup to the other, so that the pressure in the cups, which I will call the top pressure, may be shifted from one cup to the other as desired.

Each of the cups is adapted to receive liquid for measurement, and is provided with a valve, at the place of connection of the pipe 17 to prevent the liquid from passing from one cup to the other. The valve which I use is novel, in that it is simple and inexpensive to make and does not take up as much space as the ordinary float ball for the given work which it is to do, thereby allowing the cups to be made as small as possible, thereby economizing in material in the float and cup also. The float consists of a hollow semicircular cup 18, which is open at the bottom. This will stand a greater pressure than a ball float.

As the liquid rises in the cup (see cup 1, Fig. 1) it causes the float to rise by reason of the air (or gas) underneath, when the cup is full the washer 19 which is carried on the shoulder 20 of the valve will be seated on the valve seat 21, (see Fig. 1) when the liquid will cease flowing into cup 1. The valve is provided with a stem 22 which passes through the neck 16 and is provided on the top with an ordinary squared nut 23, the size thereof being such as to permit its four corners to rest on the shoulder 24 when the valve drops down, whereby the bore in the neck 16 will not be entirely closed by the said nut 23 when seated on the shoulder 24, so that air and gas are free to pass from the cup 3 into the pipe 17 and thence into the cup 2, or vice-versa, in a manner as will be hereinafter more fully described.

When the cups are in the condition shown in Fig. 1, the liquid has just been emptied from cup 2, the pressure having come from cup 1 when the liquid was entering the latter, and the liquid in cup 1 has raised the valve in cup 1 and closed off the exit of top pressure and prevented any more liquid from entering this cup.

While various valves may be used to control the flow to and from the cups, I have devised a four way valve which possesses novel features especially adapted for use with this measuring device and when combined therewith completes a simple and effective device.

The valve consists primarily of a block, preferably a solid metal one 25, which has four stems 26, 27, 28 and 29 extending from the rear thereof, and on the front is formed a valve seat 30, which is circular. From this valve seat run four ports 31, 32, 33 and 34 which connect with the bores of the necks 26, 27, 28 and 29, so that the flow to and from each of the four necks is governed from the valve seat in the manner hereinafter described. Before describing the valve it had better be noted how the different pipes are connected to the valve block. As shown in Fig. 3, the pipe 13 running from cup 3 is connected at the top to the neck 27; pipe 14 from cup 2 is connected to neck 29, directly opposite. To the neck 28 is connected a pipe 35 which supplies the carbonated liquid to the measuring cups and may be connected up to any dispensing machine. Opposite to this is connected a discharge pipe 36 which leads off to wherever the liquid is to be dispensed, generally to a glass outside the machine.

To govern the flow to and from the cups for measuring and dispensing the liquid, I provide a valve which will so connect the different pipes that one cup will be connected with the supply and the other with the discharge, and when the valve is turned to its next position the cup which was previously connected to the supply will then be connected to the discharge, and the one which had been connected with the discharge will be connected with the supply. For this purpose I provide a valve 37 which is preferably made in two parts 38 and 39. The part 38 (preferably circular) is provided with an aperture 40 adapted to receive an operating spindle 41, and to be revolved thereby. The spindle 41 may be operated by coin operated mechanism which is not a part of this invention. The other part 39 is provided with two ports 42 and two ports 43, the four of which are adapted to register with the ports in the valve seat. The two ports 42 are connected by a groove 44 formed in the valve, and the two ports 43 are likewise connected with each other by a groove 45. The part 38 is provided with pins 46 which engage holes 47 in the other half of the valve so that when the parts are assembled both halves act together and are revolved by the spindle 41, the purpose of making them separate being to get the grooves 44 and 45 inside as shown. The valve is secured to the block by means of a casing 48, which is secured thereon by any suitable means, such as the bolts 49.

The operation of my improvements is as follows: Assuming that the measuring device is attached to a coin operated vending machine such as is illustrated in my application filed April 2, 1906, Serial No. 309,338, wherein the spindle 41 is adapted to turn one quarter revolution at each operation it would be as follows: As shown in Fig. 3 the position of the valve would allow liquid from the source of supply to run from the pipe 35 through the ports 33, 42, groove 44, port 42, and through pipe 13 into cup 1. While the liquid is thus entering cup 1, the air, gas, or what I will call top pressure gas has been passing through the pipe 17 into cup 2, thus providing space for the liquid entering cup 1 and also serving to force the liquid out of cup 2, as will be seen hereafter, and taking its place. When the water in cup 1 rises to a certain height it raises the float valve 18, seats the valve, and prevents the further escape of top pressure gas, and thus the further entry of liquid. The cup 1 then has the amount of liquid which it is desired to dispense. While the valves are thus positioned the cup 2 is connected with the discharge pipe 36, through the ports 43, and groove 45, so that while the liquid was entering cup 1 the discharge of top pressure gas was forcing the liquid out of cup 2 and to the point of use. As the float in each cup is down (unseated) during this operation the top pressure is free to pass from cup 1 to cup 2, and of course the gas in the top of the cup 3 is forced into the cup 2, as the liquid enters the cup 1. As the valve is turned a quarter turn at the next operation of the spindle, the ports will be placed in such a position that the pipe 13 will be connected with the discharge 36 and the pipe 14 will be connected with the supply pipe 35 when cup 2 will commence to fill and cup 1 will commence to empty. The cups thus alternate and there is no lapse of time between the operations so that as soon as a glass of liquid has been run off another has already been measured and is ready for discharge. This is of great importance in automatic vending machines.

Another important feature of my invention is the fact that the water leaving one of the cups is forced out by all the force behind the liquid entering the other cup. This, and also the fact that no outside air enters into the mixture is of great importance where aerated liquid is being used. I believe I am the first to provide a plurality of measuring cups which are so connected as to operate alternately, and where the liquid being discharged has the force of the incoming liquid to force it out.

This is essentially a high pressure apparatus. It becomes inoperative when the pressure falls to a low pressure, as the vent valves will then not be tight.

Various alterations may be made in the device for carrying out my invention without departing from the scope and spirit of the following claims.

Having described my invention, what I claim is:

1. In a measuring device, the combination of a plurality of measuring cups, and a valve having a seat provided with the four ports 31, 32, 33, and 34, the measuring cups being connected to the alternate ports in said seat, a supply and a discharge pipe connected to the other alternate ports in said seat, said valve having ports 42 and 43 registering with the ports in said seat, and means of communication between the two ports 42 and the two ports 43, and means for revolving said valve so as to alternately connect each of said cups with the supply and discharge pipes.

2. In a measuring device, the combination of a plurality of measuring cups, a valve therefor having a seat provided with the four ports 31, 32, 33 and 34, said cups being connected with the ports 32 and 34, a supply pipe connected with port 33 and a discharge pipe with port 31, said valve having ports 42 and 43, registering with the ports in the seat, the ports 42 being connected by a channel 44 and the ports 43 by a channel 45 whereby the turning of said valve will cause the same to connect the ports so that the said cups will be alternately connected with the supply and discharge pipes.

Signed this 29th day of March, 1906.

HENRY PEIN.

Witnesses:
 G. I. ARONORD,
 CHAS. G. HENSLEY.

Copies of this patent may be obtained for five cents each, by addressing the "Commissioner of Patents, Washington, D. C."